Oct. 15, 1929.  C. E. OGDEN  1,731,981
RECTIFIER FOR ALTERNATING CURRENTS
Filed Aug. 1, 1921
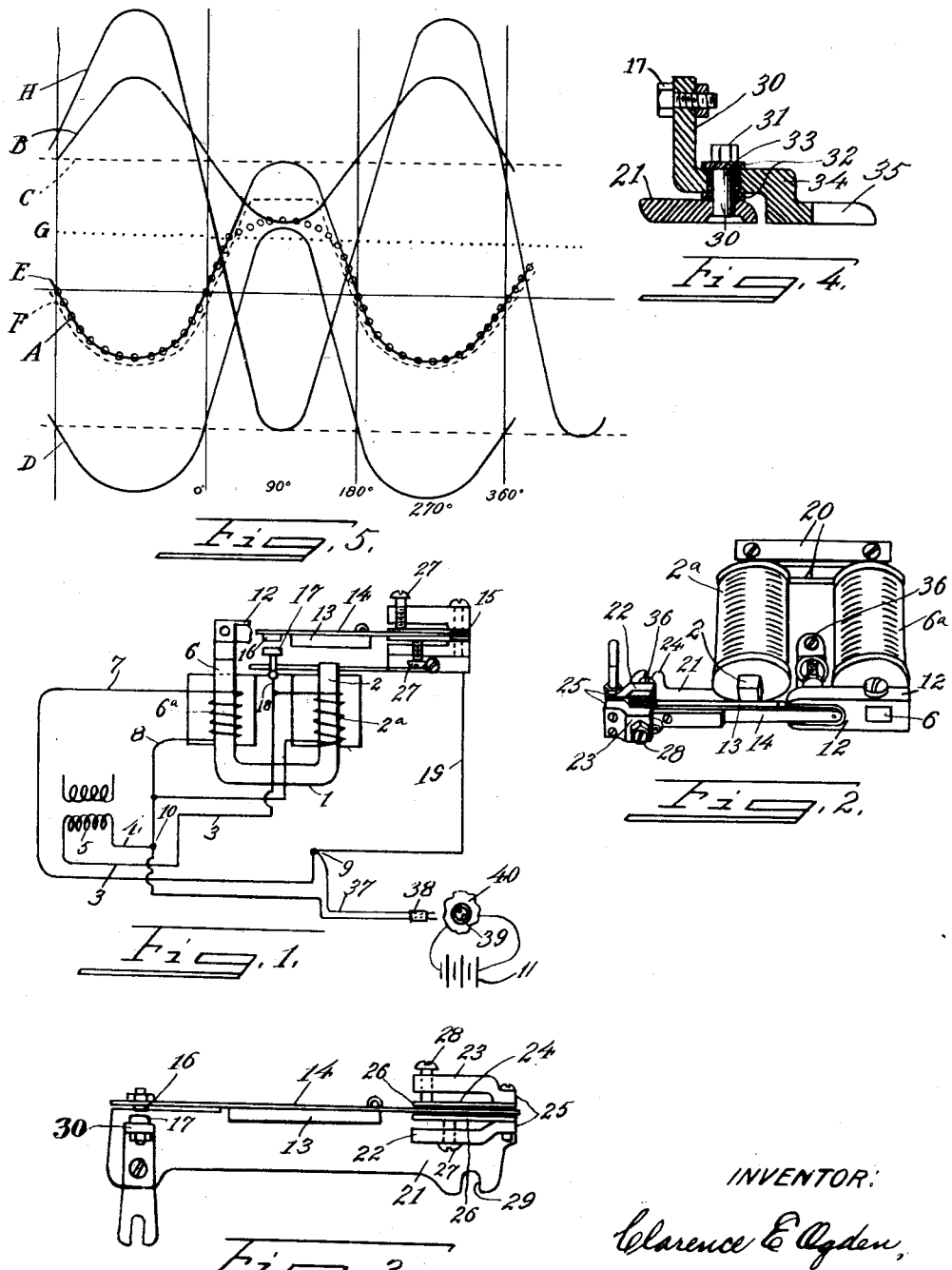
INVENTOR:
Clarence E. Ogden,
BY Arthur H. Ewald,
ATTORNEY.

Patented Oct. 15, 1929

1,731,981

UNITED STATES PATENT OFFICE

CLARENCE E. OGDEN, OF CINCINNATI, OHIO

RECTIFIER FOR ALTERNATING CURRENTS

Application filed August 1, 1921. Serial No. 489,048.

My invention relates to rectifiers for alternating currents and has particular reference to rectifiers of the vibrator type.

The principal object of the present invention is to provide a simple and efficient, and at the same time, inexpensive rectifier for alternating currents for use in the charging of storage batteries, especially storage batteries of the type used for starting, ignition and lighting systems of automobiles.

A further object of this invention is to provide in a rectifier for alternating currents of the vibrator type, simplified means whereby the vibrator may be accurately and effectively adjusted.

Another object of the invention is to provide in a rectifier of the type mentioned, a vibrator unit which may be removed as a whole from the device either for replacement, repairs or adjustment.

Further objects of the invention will appear from the following detailed description thereof.

In the drawings:

Figure 1, is a diagrammatic view of the rectifier constructed in accordance with this invention, illustrating the principle and operation thereof.

Figure 2, is a perspective of the mechanical elements of the rectifier.

Figure 3, is a top view of the vibrator unit removed from the base.

Figure 4 is a section of the vibrator unit.

Figure 5 is a chart illustrative of the principle of operation.

Referring first to Figure 1 of the drawings, the numeral 1 indicates a U-shaped electro-magnet, preferably of laminated iron construction, as hereinafter specifically described. The leg 2 of the magnet 1, is provided with a coil 2$^a$, connected by means of conductors 3 and 4 with the secondary coil 5 of a transformer; the other leg 6 of the electro-magnet is provided with a coil 6$^a$ connected by means of wires 7 and 8 to binding posts 9 and 10 respectively, the latter being arranged for connection with a storage battery 11. It will thus be seen that the coil 2$^a$ is permanently in circuit with the transformer secondary coil, and that the coil 6$^a$ is, when battery 11 is connected, connected across said battery. The leg 6 of the magnet is somewhat longer than the opposite leg, and is arranged to receive a pole piece 12, which extends part-way across the gap between the legs of the electro-magnet. The armature 13, is mounted on a vibrator spring 14, one end of which is rigidly secured to a post at 15. The armature is arranged to operate directly in the field of the pole piece 12, and is thus magnetized thereby. The free end of spring 14, is provided with a point 16, arranged to make contact with a fixed point 17, connected through its post by a wire 18 with the wire 3. The vibrator post is connected by a wire 19 with the battery terminal 9.

Before describing the operation of the device, I will now set forth more specifically the mechanical elements of construction which enter into the efficient performance of the same, as well as its simplicity of adjustment, repairs and replacement of parts:

The U-shaped electro-magnet is constructed of L-shaped laminations of iron. The bases of the laminations are secured between bars 20, and it is obvious that by moving the respective L units apart, the air gap between the parallel legs may be increased or diminished, thus providing for adjustments in the magnetic air gap. The leg 6 is somewhat longer than the opposite leg so as to receive the pole piece 12, which is secured thereto by means of a set screw. The end of the pole piece is notched, or forked, so that the end of the spring 14 and armature 13 may be more effectively saturated thereby.

The vibrator unit comprises a base-plate 21, provided at one end with a post 22. Arranged to be secured to the post 22 is a plate 23 of complementary shape to form a channel 24 between it and post. The vibrator spring 14 is secured between the flanges 25 of the post 22 and plate 23. Secured between the flanges 25, on either side of the spring 14, are resilient plates 26, constructed of rubber, spring steel or similar material. The post 22 and plate 23 are provided with adjusting screws 27 and 28 which bear against the plates 26, the screw 28 being slightly farther from the mounting 15 than the screw 27, thus permitting adjustment of the frequency of vibration of the vibrator spring 14 throughout a wide range, as will be obvious. The armature 13 is secured at one of its ends to the spring 14 by means of a screw, rivet or otherwise; the opposite end of the armature 13 is unsecured, and the armature is thus permitted to move even after the points 16 and 17 are in contact. The base 21 of the vibrator unit is provided with a notch or slot 29. The point 17 is carried by a post 30, which is assembled on the base 21 by means of a bolt 31. The post 30 is insulated from the base 21 and bolt 31 by means of washers 32 and a sleeve 33. The post 30 has a horizontal section 34, the bottom of which is in the same plane as the bottom of the base 21. The end of the section 34 is notched, as shown at 35. Screws 36 arranged to engage in the notches 29 and 35 secure the vibrator unit in proper assembly in the device.

The posts 9 and 10 are connected by means of a cord 37 with a plug 38 which is arranged to make connection in a socket 39 in the dash 40, or other suitable part of an automobile, where said socket or receptacle is permanently mounted.

The operation of the rectifier is as follows:
When the battery 11 to be charged is connected, and the primary of the transformer is connected to a line circuit providing alternating current, there is a constant circuit through the battery 11 and coil $6^a$, as heretofore mentioned, thus establishing in the leg 6 of the U-shaped electromagnet, a magnetism of constant polarity, which for the purposes of illustration I will assume to be a north pole, and through the coil $2^a$ on the opposite leg of the electromagnet is a constant circuit of alternating current from the transformer secondary coil 5, thus producing in the leg 2 of the magnet a magnetic flux of alternating polarity. As will be seen, the magnetic flux in this leg of the magnet, during one alternation, co-operates with the magnetic flux in the leg 6 which is of constant polarity, thus increasing the intensity thereof, i. e., when the alternation produces a flux of south polarity in the leg 2, on the assumption that the opposite leg is of north polarity by reason of the battery circuit, this north polarity is intensified; during the opposite alternation the alternating magnetic flux being of north polarity tends to demagnetize the opposite leg, but this tendency does not wholly overcome the polarity established by the battery circuit, the leg becoming a north pole of reduced intensity. The armature 13 is, as above stated, arranged to operate in the forked end of the pole piece 12; this reduces the magnetic reluctance and causes the armature to be highly saturated at all times by the magnetic flux in said pole piece. The contacts 16 and 17 operate directly in the magnetic field of the pole piece 12, and thus any ordinary tendency to arc is quenched and a virtually sparkless operation is effected. The magnetic reluctance from the center of the coil $6^a$ to the end of the leg 2 of the magnet is practically equal to the reluctance from said center through the pole piece 12 and armature 14 to a point opposite the leg 2, and the polarity of the armature and leg 2 are therefore as affected by the coil $6^a$ of opposite polarity and equal intensity.

Referring to the Figure 5, the theory of operation will be apparent. In this chart the line A, illustrates the current alternations; B, the magnetic flux in the armature 14 opposite the leg 2 of the electromagnet; C, the theoretic flux at the same point in the armature if unaffected by the interaction of the alternating polarity of the leg 2; D, the magnetic flux of the leg 2 of the electro-magnet; E, the armature movement; F, the vibrator spring movement; G, the battery E. M. F., and H, the theoretical attraction between the leg 2 of the electro-magnet and the armature 14. The degrees of the alternating cycle are indicated by the vertical lines. At the beginning of the positive alternation, at the point indicated by the second vertical line from the left, on the assumption that the battery produces a north polarity in the armature, the magnetic flux in the alternating pole of the electro-magnet rises until it becomes of slightly north polarity, the intensity of this polarity being diminished by reason of the north polarity of the opposite leg; at the same time the polarity of the armature decreases as indicated by the curve B, but still remains of north polarity. At this time, as indicated by the curves E and F, the armature and vibrator spring are at their innermost points, the points 16 and 17 having been in contact during that portion of the positive alternation where the alternating E. M. F. exceeds the battery E. M. F., thus charging the battery during this fraction of the cycle. At the 90 degree point in the positive alternation, the polarity of the armature and alternating leg being the same, there is a repulsion, as shown by the curve H, which forces the armature outwardly breaking the contact between the points 16 and 17 at the proper instant. In the negative alternation, the leg 2 of the electro-magnet is of intense south polarity; this co-operates with the coil $6^a$ in intensifying the north polarity of the armature 14, and at the culmination of this alternation the armature is attracted by the leg 2 of the magnet, thus drawing the armature and vibrator spring inwardly to make contact during the next positive alternation. In order that the device shall operate, and without excessive sparking, it is necessary that the vibrator frequency should synchronize with the alternating frequency, and for this, provision has been made by means of the mechanism above described, permitting adjustments of the vibrator spring as above set forth.

The resistance of the spring 14 is so gauged that neither the leg 2 nor the leg 6 of the electromagnet, when unassisted by the flux generated by the flow of current in the opposite coil, is sufficient to cause the vibrator to operate, and thus when the battery is disconnected and the alternating current supply connected, the consumption of energy is but slight, the coil $2^a$ acting like the primary of a transformer on open circuit and consuming a wattless current; and when the battery is connected and the alternating supply circuit open, the battery is not permitted to discharge, the points 16 and 17 being open and the discharge through the fine wire of coil $6^a$ being negligible.

It will be observed that changing the polarity of the battery connections will cause the battery to charge on the opposite half of the alternating current cycle, the polarity of the leg 6 of the magnet being correspondingly changed. It thus becomes unnecessary to ascertain the polarity of the battery circuit before the connections are made.

By reason of the fact that the vibrator contacts, as well as the spring and armature, are mounted on a separable unit, it will be seen that replacements, repairs and adjustments of the only movable and wearing parts of the device are greatly simplified and facilitated.

While the U-shaped electromagnet described above represents a preferred and highly efficient form of rectifier in accordance with this invention, the same also contemplates the making of the respective legs as separate magnets so related that the magnetic flux generated by the coil of each shall interlace substantially as and for the purpose set forth.

Having thus fully described my invention, what I claim as new and desire to secure by Letters Patent, is:

1. In a rectifier for alternating currents, in combination with a source of alternating current, and an electromagnet arranged to be energized thereby, a vibrator unit comprising a base plate, a post on said base, a plate arranged to be secured to said post, said post and plate being shaped so as to leave a vertical channel between them when assembled, a vibrator spring secured between said post and plate, adjusting screws in said post and plate and arranged to bear on opposite sides of said spring at points unequally distant from its mounting, a second post secured to the other end of said base, means for insulating said second post from said base, cooperating contacts on said spring and second post, and means whereby said unit may be secured in operative relation with said electromagnet with said base and second post connected in said alternating circuit.

2. In a rectifier for alternating currents, in combination with a source of alternating current and an electromagnet arranged to be energized thereby, a vibrator unit comprising a base plate, a post on said base, a plate arranged to be secured to said post, said post and plate being shaped so as to leave a vertical channel between them when assembled, a vibrator spring secured between said post and plate, adjusting screws in said post and plate and arranged to bear on opposite sides of said spring at points unequally distant from its mounting, an armature secured to said spring at one end, the other end of said armature being free to travel independent of said spring, a second post secured to the other end of said base, means for insulating said second post from said base, cooperating contacts on said spring and second post, and means whereby said unit may be secured in operative relation with said electromagnet with said base and second post connected in said alternating circuit.

3. In a rectifier for alternating currents, in combination with a source of alternating current and an electromagnet arranged to be energized thereby, a vibrator unit comprising a base plate, a post on said base, a plate arranged to be secured to said post, said post and plate being shaped so as to leave a vertical channel between them when assembled, a vibrator spring secured between said post and plate, resilient plates at the sides of said spring between said post and plate, adjusting screws in said post and plate and arranged to bear on said resilient plates on opposite sides of said spring at points unequally distant from its mounting, a second post secured to the other end of said base, means for insulating said second post from said base, cooperating contacts on said spring and second post, and means whereby said unit may be secured in operative relation with said electromagnet with said base and second post connected in said alternating circuit.

4. In a rectifier for alternating currents, in combination with a source of alternating current and electromagnet arranged to be energized thereby, a vibrator unit comprising a base plate, a post on said base, a plate arranged to be secured to said post, said post and plate being shaped so as to leave a vertical channel between them when assembled, a vibrator spring secured between said post and plate, resilient plates at the sides of said spring between said post and plate, adjusting screws in said post and plate and arranged to bear on said resilient plates on opposite sides of said spring at points unequally distant from its mounting, an armature secured to said spring at one end, the other end of said armature being free to travel independent of said spring, a second post secured to the other end of said base, means for insulating said second post from said base, cooperating contacts on said spring and second post, and means whereby said unit may be secured in operative relation with said electromagnet with said base and second post connected in said alternating circuit.

CLARENCE E. OGDEN.